(12) United States Patent
Canning et al.

(10) Patent No.: US 7,747,647 B2
(45) Date of Patent: Jun. 29, 2010

(54) DISTRIBUTING PERMISSION INFORMATION VIA A METADIRECTORY

(75) Inventors: William P. Canning, Issaquah, WA (US); David R. Mowers, Issaquah, WA (US); Geeman Yip, Kirkland, WA (US); Cezar Ungureanasu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 50 days.

(21) Appl. No.: 11/322,846

(22) Filed: Dec. 30, 2005

(65) Prior Publication Data

US 2007/0153814 A1 Jul. 5, 2007

(51) Int. Cl.
*G06F 7/00* (2006.01)
*G06F 17/30* (2006.01)

(52) U.S. Cl. .................................. 707/785; 707/756
(58) Field of Classification Search ................. 370/401; 707/9

See application file for complete search history.

(56) References Cited

U.S. PATENT DOCUMENTS

| | | | | |
|---|---|---|---|---|
| 5,416,917 | A * | 5/1995 | Adair et al. ................. | 707/203 |
| 5,608,874 | A * | 3/1997 | Ogawa et al. ............... | 709/246 |
| 5,875,197 | A * | 2/1999 | Connell ...................... | 714/726 |
| 6,067,623 | A * | 5/2000 | Blakley et al. .............. | 726/5 |
| 6,178,506 | B1  | 1/2001 | Quick, Jr. | |
| 6,226,649 | B1 * | 5/2001 | Bodamer et al. ......... | 707/104.1 |
| 6,279,003 | B1 * | 8/2001 | Lee et al. .................... | 707/100 |
| 6,356,901 | B1 * | 3/2002 | MacLeod et al. ............ | 707/6 |
| 6,381,602 | B1 * | 4/2002 | Shoroff et al. ............... | 707/9 |
| 6,542,515 | B1 * | 4/2003 | Kumar et al. ............... | 370/463 |
| 6,651,096 | B1 * | 11/2003 | Gai et al. .................... | 709/223 |
| 6,658,458 | B1 * | 12/2003 | Gai et al. .................... | 709/215 |
| 6,757,720 | B1 * | 6/2004 | Weschler, Jr. ............... | 709/220 |
| 6,807,181 | B1 * | 10/2004 | Weschler .................... | 370/400 |

(Continued)

FOREIGN PATENT DOCUMENTS

EP 1557741 A2 7/2005

(Continued)

OTHER PUBLICATIONS

Blezard, David J., et al., "One User, One Password: Integrating Unix Accounts and Active Directory", SIGUCCS '02, Providence, RI, Nov. 20-23, 2002, pp. 5-8.*

(Continued)

*Primary Examiner*—Robert Stevens
(74) *Attorney, Agent, or Firm*—Workman Nydegger (57) ABSTRACT

A permission information system and method are provided. The system facilitates management of permissions across a wide variety of systems and applications in a network environment. The system includes a data store which is a central repository that maintains permissions (e.g., in a user readable format). The permissions can, optionally, be translated into a format that is useable by endpoint system(s).

The system further includes a metadirectory component which notices change(s) that are created in the data store and sends the security information to the endpoint system(s). The new security policy can then installed and enforced on the endpoint systems. The system can thus employ the capabilities of a metadirectory to distribute security policy(ies) to these end-point systems. The system can, optionally, include one or more translator(s) which transform the user readable format into a format that is consumable by the endpoint system(s).

15 Claims, 6 Drawing Sheets

U.S. PATENT DOCUMENTS

| | | | |
|---|---|---|---|
| 6,981,217 B1 * | 12/2005 | Knauft et al. | 715/210 |
| 7,512,990 B2 * | 3/2009 | Haugh et al. | 726/30 |
| 2002/0019936 A1 * | 2/2002 | Hitz et al. | 713/165 |
| 2002/0026592 A1 | 2/2002 | Gavrila et al. | |
| 2002/0031230 A1 | 3/2002 | Sweet et al. | |
| 2002/0143785 A1 * | 10/2002 | Pugh | 707/102 |
| 2002/0184525 A1 * | 12/2002 | Cheng | 713/201 |
| 2003/0046576 A1 | 3/2003 | Howard et al. | |
| 2003/0081790 A1 | 5/2003 | Kallahalla et al. | |
| 2003/0154403 A1 | 8/2003 | Mowers et al. | |
| 2003/0212806 A1 | 11/2003 | Mowers et al. | |
| 2004/0064502 A1 * | 4/2004 | Yellepeddy et al. | 709/203 |
| 2004/0098615 A1 | 5/2004 | Mowers et al. | |
| 2004/0133487 A1 * | 7/2004 | Hanagan et al. | 705/34 |
| 2004/0193906 A1 * | 9/2004 | Dar et al. | 713/200 |
| 2004/0225663 A1 * | 11/2004 | Wayt et al. | 707/100 |
| 2004/0225670 A1 * | 11/2004 | Cameron et al. | 707/101 |
| 2004/0225674 A1 * | 11/2004 | Benson et al. | 707/102 |
| 2004/0225680 A1 * | 11/2004 | Cameron et al. | 707/104.1 |
| 2004/0268146 A1 | 12/2004 | Oberst | |
| 2005/0015674 A1 * | 1/2005 | Haugh | 714/38 |
| 2005/0065977 A1 * | 3/2005 | Benson et al. | 707/104.1 |
| 2005/0086491 A1 * | 4/2005 | Haugh et al. | 713/182 |
| 2005/0091068 A1 * | 4/2005 | Ramamoorthy et al. | 705/1 |
| 2005/0120106 A1 * | 6/2005 | Albertao | 709/223 |
| 2005/0165752 A1 * | 7/2005 | Mathew et al. | 707/3 |
| 2005/0262132 A1 * | 11/2005 | Morita et al. | 707/102 |
| 2006/0020586 A1 * | 1/2006 | Prompt et al. | 707/3 |
| 2006/0036725 A1 * | 2/2006 | Chand | 709/223 |
| 2006/0184530 A1 * | 8/2006 | Song et al. | 707/9 |
| 2006/0206707 A1 * | 9/2006 | Kostal et al. | 713/156 |
| 2007/0039045 A1 * | 2/2007 | McKee et al. | 726/21 |
| 2007/0056019 A1 * | 3/2007 | Allen et al. | 726/1 |

FOREIGN PATENT DOCUMENTS

| | | |
|---|---|---|
| WO | WO2004028070 | 4/2004 |

OTHER PUBLICATIONS

Haas, L. M., et al., "Transforming Heterogeneous Data with Database Middleware: Beyond Integration", IEEE Data Engineering Bulletin, vol. 22, © 1999, pp. 31-36.*

Chacon, Michael, "Unifying Diverse Directories", Network Magazine, Feb. 2001, pp. 70-74.*

Seligman, Len, et al., "XML's Impact on Databases and Data Sharing", Computer, vol. 34, Issue 6, Jun. 2001, pp. 59-67.*

Kaminsky, Michael, et al., "Decentralized User Authentication in a Global User File System", SOSP '03, Bolton Landing, NY, Oct. 19-22, 2003, pp. 60-73.*

"Universal IdP: Universal Identity Manager." http://web.archive.org/web/20041108003452http://universal.com/solutions/functionality/im/ last viewed Nov. 21, 2005, 3 pages.

"Metadirectory Practices for Enterprise Directories in Higher Education." http://middleware.internet2.edu/metadirectories/rpr-nmi-mace_dir-metadirectores_practices-1.0.html#_Toc487507889 (2002) 24 pages.

"Thor Technologies; Identity Management. Delivered; How is Xellerate different from a Metadirectory?" http://www.thortech.com/questions/index.asp last viewed Nov. 21, 2005, 16 pages.

"The Role of Identity Management in Information Security: Part 1—The Planning View; Functional Areas of Identity Management." http://techupdate.zdnet.com/techupdate/stories/main/Idenity_Management_Information_Security_Part_1.html (Nov. 2003) 6 pages.

"Microsoft Metadirectory Services Concepts and Architecture; The Identity Management Challenge." http://students.estrellamountain.edu/larson/ms/ad2/htm last viewed Nov. 21, 2005, 24 pages.

* cited by examiner

DISTRIBUTING PERMISSION INFORMATION VIA A METADIRECTORY

BACKGROUND

Modern operating systems drive many of today's technology-based innovations by offering a platform for both hardware and software development while serving many diverse needs. These systems have evolved from more simplistic file management systems to more complex workstations that provide high-end performance at reasonable cost. Such systems often include multi-processing architectures, high-speed memory, advanced peripheral devices, a variety of system libraries and components to aid software development, and intricate/interleaved bus architectures, for example. At the heart of these systems are sophisticated operating systems that manage not only computer-related hardware but, a vast array of software components having various relationships. These components are often described in terms of objects or classes having multi-tiered relationships such as in a hierarchical tree arrangement for files and directories that are found in many data management systems.

Emerging technologies have spawned other type structures and models for storing and managing objects within a database. These include such hierarchical structures as containment hierarchies that enable multiple relationships between respective items or objects. Such hierarchies are often modeled as a Directed Acyclic Graph (DAG) and support multiple path relationships to an item from a root node of the containment hierarchy. Regardless of the type of data structure involved, however, security models have been applied to these systems to determine and facilitate how entities (e.g., users or other components) are permitted access to objects or items residing in the respective structures.

Particularly on computer networks, management of permission to access and/or modify objects and/or items (e.g., files) can be a difficult and tedious task. Conventional system(s) in which endpoint system(s) are required to ascertain whether a particular user possesses the necessary credentials to access and/or modify a particular item can result in significant computing overhead.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A permission information system and method are provided. The system facilitates management of permissions across a wide variety of systems and applications in a network environment. In a network environment, security of information is a significant concern. One of the major difficulties is the management of permissions across a wide variety of endpoint system types (e.g., NTFS, Active Directory®, Rights Management Services, SQL server, Authorization Manager, SharePoint®, Host and/or custom application(s)). With conventional systems, enforcement of security policies has generally been the domain of endpoint system(s). That is, it has been difficult to push permissions out to the endpoint system(s) to actually enforce security policies.

The system includes a data store which is a central repository that maintains permissions (e.g., in a user readable format). For example, the data store can be a relational database system. The permissions can, optionally, be translated into a format that is useable by endpoint system(s) (e.g., NTFS, Active Directory®, Rights Management Services, SQL server, Authorization Manager, SharePoint®, Host etc.).

The system further includes a metadirectory component which notices change(s) that are created in the data store and sends the security information to endpoint system(s). The new security policy can then be installed and enforced on the endpoint systems. The system can thus employ the capabilities of a metadirectory to distribute security policy(ies) to these end-point systems.

The system can, optionally, include one or more translator(s) which transform from the format employed in a repository (e.g. a user readable format) into a format that is consumable by the endpoint system(s). In one example, a particular translator can be employed to translate a user readable format into a format that is consumable by each of the endpoint system(s). In another example, the system can include a plurality of translators, with each of the translators able to translate the user readable format into a format that is consumable by a particular endpoint system.

More specifically, the system can receive permission information, for example, from an administrator. The permissions can be defined in an opaque or user readable format and stored in the data store (e.g., a central repository, or one of a set of such repositories). Thereafter, one or more of the translator(s) can transform the user readable data into a format that is consumable by the end point system(s).

Once the repository data has been transformed by the translator(s), the metadirectory component can notice the change(s) that have been created by the translator(s). The metadirectory component can then send the security information to the end point system (e.g., through a custom agent). Thereafter, the new security policy can be installed and enforced on the end point system(s).

The translator(s) can be run against data stored in the repository (or repositories) in order to translate the permission rule(s) into a form that is usable by the end system(s). For instance, on a Windows® file system, the translator can translate the rules above into a properly formatted Access Control List (ACL). The ACL can be stored, for example, in a separate area in a data store (or stores). The translator(s) can, optionally, perform other processing such as segregation of duties and/or other rules checkers.

After the translator(s) have run, the metadirectory component can be notified of change(s) in the data store. Thereafter, the metadirectory component can push the translated rule(s) to the end system(s). For example, based upon pre-configured rule(s), the metadirectory component can push ACLs and other properly formatted permission information out to the end system(s). The end system(s) then have new permission information in the appropriate format that the end system(s) can apply to enforce the security policy established by an administrator, a set of administrators, and/or one or more processes serving in an administrative role, via the administration component.

Optionally, the system can further include an administration component that allows an administrator and/or set of administrators or one or more processes performing administration to manipulate data in the data store (e.g., access data repository (ADR)). For example, the administrator can assign permissions to resource(s) using a web-based and/or other front end tool. In one example, the information is stored in a format that is convenient for interaction by the administrator. In another, it is stored in a format convenient for a system employing workflow to define administrative processes.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Figure 1:
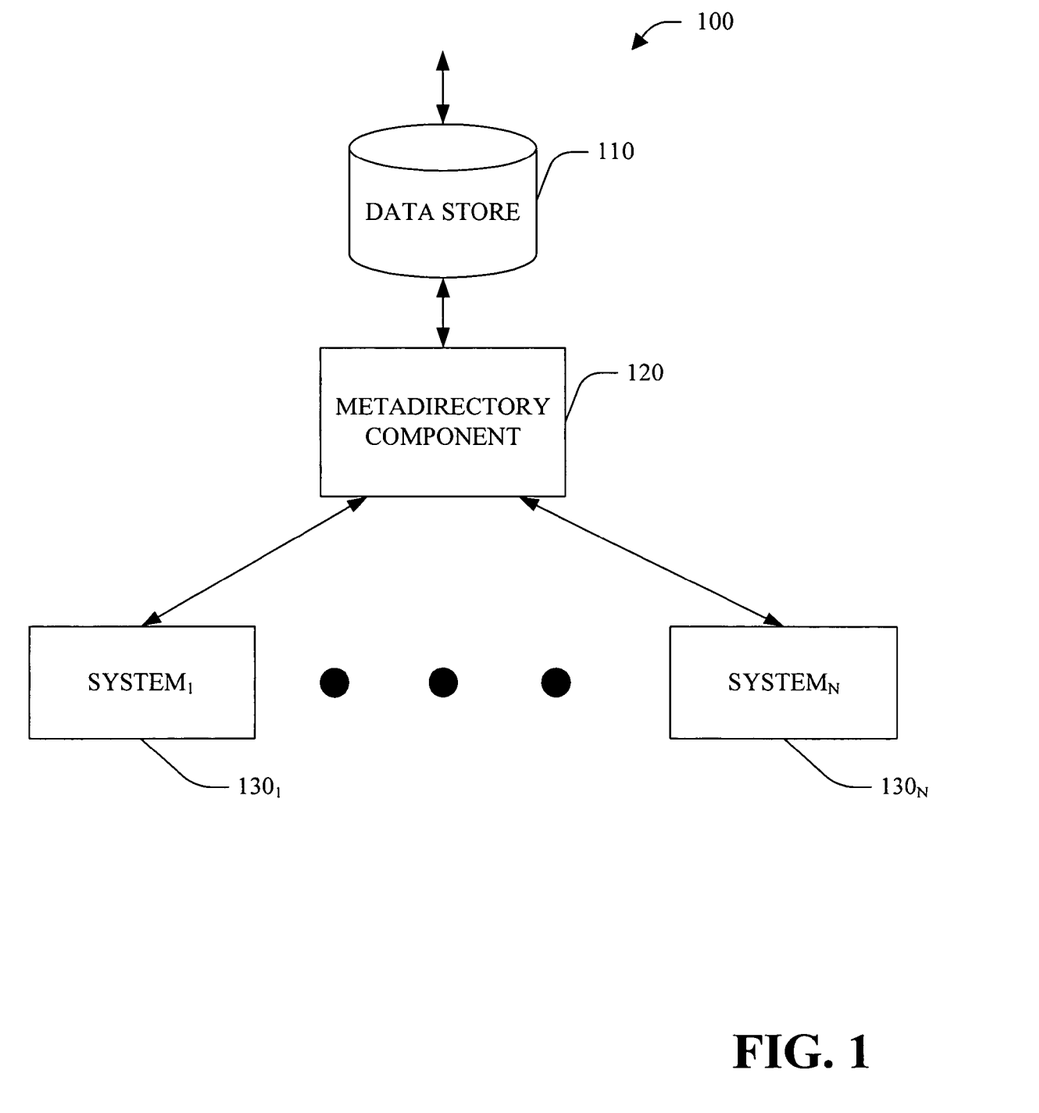
FIG. 1 is a block diagram of a permission information system.

Referring to FIG. 1, a permission information system 100 is illustrated. The system 100 facilitates management of permissions across a wide variety of systems and applications in a network environment. In a network environment, security of information is a significant concern. One of the major difficulties is the management of permissions across a wide variety of endpoint system 130 types (e.g., NTFS, SQL Server, SharePoint®, etc.) With conventional systems, it is difficult to push permission out to the endpoint system(s) to actually enforce security policies.

The system 100 includes a data store 110 which is a central repository that maintains permissions (e.g., in a user readable format). As discussed in greater detail below, in one example, the permissions can be translated into a format that is useable by endpoint system(s) 130 (e.g., Active Directory®, Rights Management Services, SQL, Authorization Manager, Host, etc.).

The system 100 further includes a metadirectory component 120 which notices change(s) that are created in the data store 110 and sends the security information to the endpoint system(s) 130. Metadirectories have been traditionally employed to synchronize semi-volatile user information and communicate with many of the endpoint systems 130 that need security updates. Further, as employed in the system 100, metadirectories are optimized for pushing data to a wide variety of endpoint systems 130 and for pushing data changes from a central repository to many endpoint systems 130.

The system 100 employs the metadirectory component 120 to synchronize relatively static security policy information. The new security policy can then be installed and enforced on the endpoint systems 130. Having receiving the modified security policy, the endpoint systems 130 can enforce the policy with minimal processing overhead. The system 100 can thus employ the capabilities of a metadirectory to distribute security policies to these endpoint systems 130.

Figure 2:
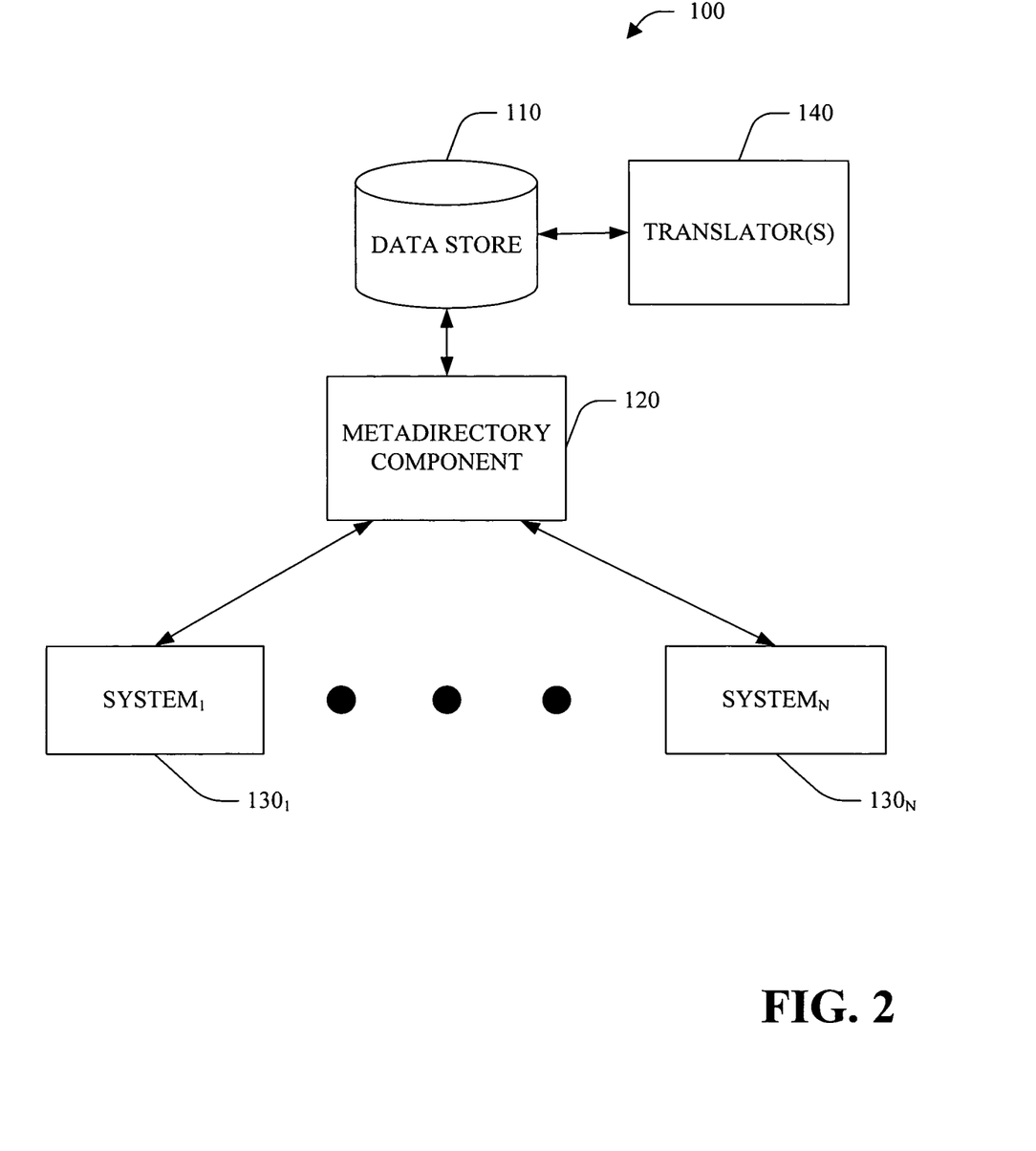
FIG. 2 is a block diagram of a permission information system.

Turning to FIG. 2, the system 100 can, optionally, include one or more translator(s) 140 which transform the user readable format into a format that is consumable by the endpoint system(s). In one example, a particular translator 140 can be employed to translate the user readable format into a format that is consumable by each of the endpoint system(s) 130. In another example, the system 100 can include a plurality of translators 140, with each of the translators 140 able to translate the user readable format into a format that is consumable by a particular endpoint system 130.

More specifically, the system 100 can receive permission information, for example, from an administrator. The permissions can be defined in a user readable format and stored in the data store 110 (e.g., central repository). Thereafter, one or more of the translators 140 can transform the user readable data into a format that is consumable by the end point system(s) 130.

Once the user readable data has been transformed by the translator(s) 140, the metadirectory component 120 can notice the changes that have been created by the translator(s) 140. The metadirectory component 120 can then send the security information to the end point system 130 (e.g., through a custom agent). Thereafter, the new security policy can be installed and enforced on the end point system(s) 130.

This arrangement can have a number of benefits. First, the software installed on the end system 130 (if any) is much less intrusive than a centralized approach in which each authorization request is redirected to a central server. Additionally, once the policies are loaded on the end system(s) 130, no further communication occurs over the network to check permissions which can speed up access. Finally, a network failure does not impact the ability to check permissions, since the permissions are stored locally in the end system(s) 130.

Figure 3:
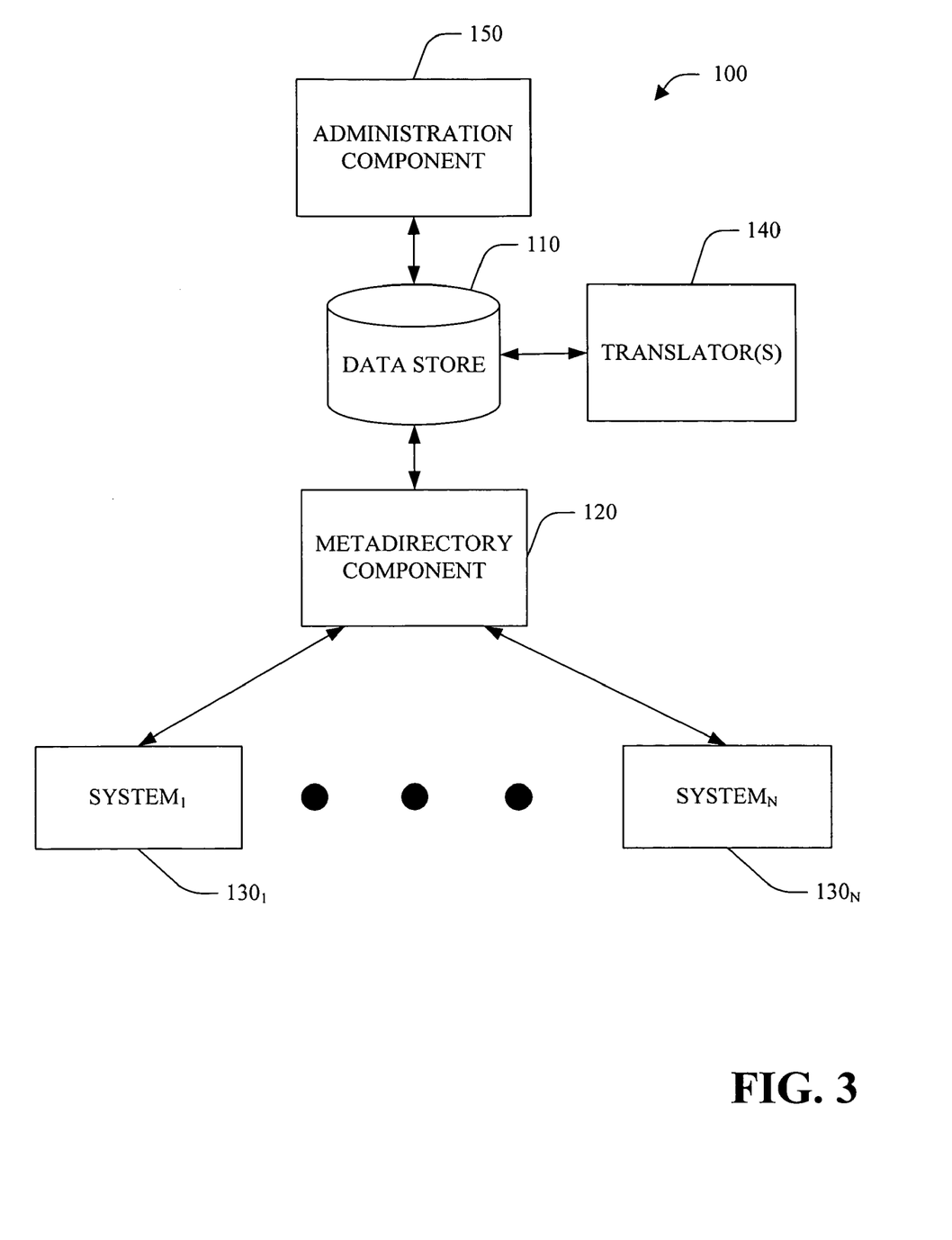
FIG. 3 is a block diagram of a permission information system.

Referring next to FIG. 3, the system 100 can, optionally, further include an administration component 150. The administration component 150 allows an administrator to manipulate data in the data store 110 (e.g., access data repository (ADR)). In one example, the administrator can assign permissions to resource(s) using a web-based and/or other front end tool. For example, the administrator can define an access rule that states that the group of users named "Finance" has read/write access to the directory named "Financial Reports", whereas everyone else has no access to this directory.

This access information is stored in the access data store 110 which can be, for example, a relational database system. In one example, the access information is stored in a format that is convenient for interaction by the administrator. For example, the data can be stored in a table in the access data store 110 in the following form:

TABLE 1

| Rule Number | Rule Precedence | Group | Resource | Permissions |
|---|---|---|---|---|
| 1 | 99 | Finance | \Financial Reports | RW |
| 2 | 1 | Everyone | \Financial Reports | None |

The translator(s) 140 can be run against data stored in the data store 110 in order to translate the permission rule(s) into a form that is usable by the end system(s) 130. For instance, on a Windows® file system, the translator 140 can translate the rules above into a properly formatted Access Control List (ACL). The ACL can be stored, for example, in a separate area in the data store 110. The translator(s) 140 can, optionally, perform other processing such as segregation of duties and/or other rules checkers.

After the one or more translators 140 have run, the metadirectory component 120 can be notified of changes in the data store 110. Thereafter, the metadirectory component 120 can push the translated rule(s) to the end system(s) 130. For example, based upon pre-configured rules, the metadirectory component 120 can push ACLs and other properly formatted permission information out to the endpoint system(s) 130. The end system(s) 130 then have new permission information in the appropriate format that the endpoint system(s) 130 can apply to enforce the security policy established by the administrator via the administration component 150.

It is to be appreciated that the system 100, the data store 110, the metadirectory component 120, the endpoint system(s) 130, the translator(s) 140, and/or the administration component 150 can be computer components as that term is defined herein. Additionally, those skilled in the art will recognize that there can be one or more instances of the data store 110, the metadirectory component 120, the endpoint system(s) 130, the translator(s) 140 and/or the administration component 150.

Figure 4:
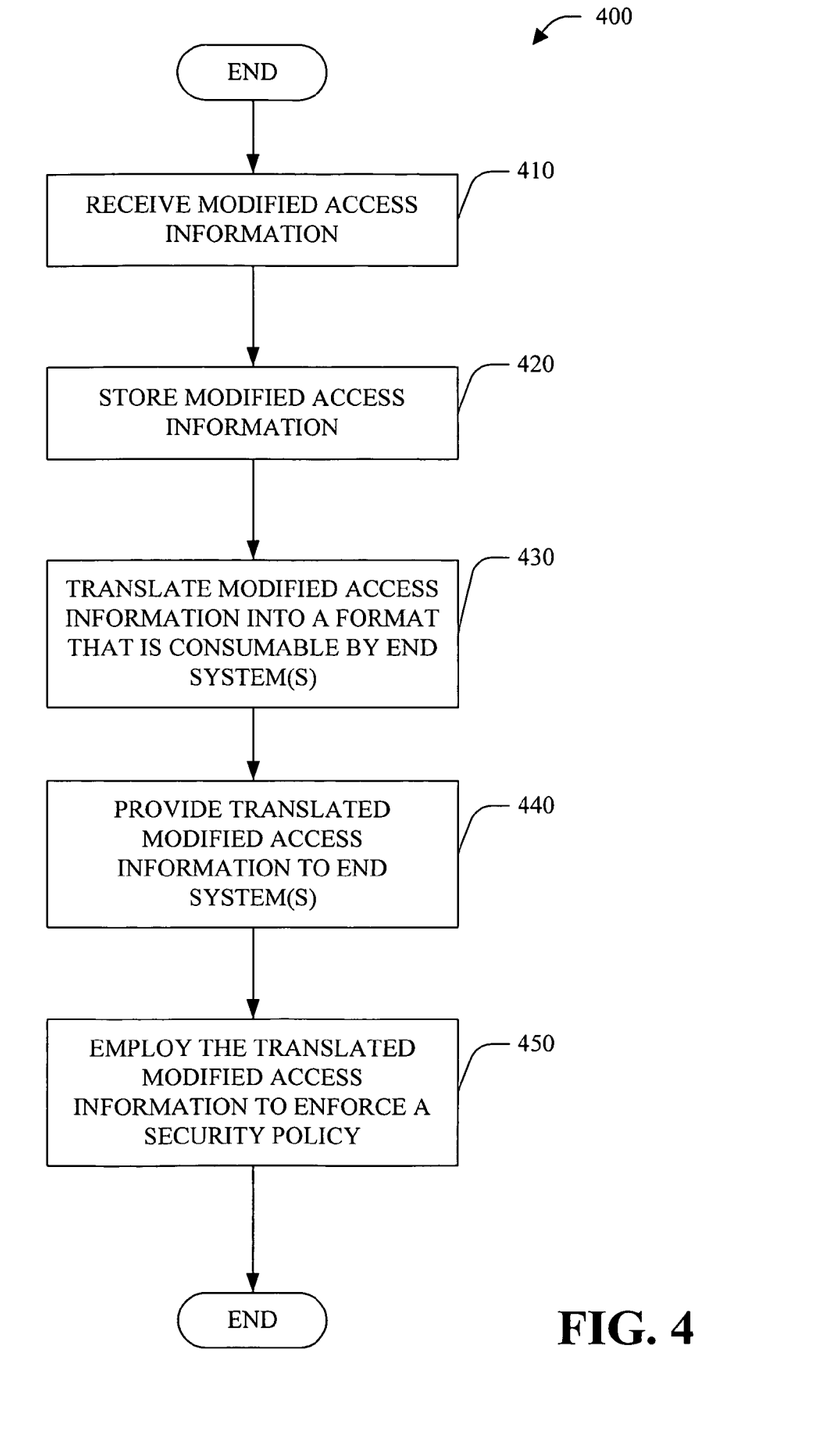
FIG. 4 is a flow chart of an access permission information system.

Turning briefly to FIG. 4, a methodology that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodology.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 4, an access permission information method 400 is illustrated. At 410, modified access information is received, for example, via an administration component 150. At 420, the modified access information is stored (e.g., in an access data store 110). At 430, the modified access information is translated into a format that is consumable by end system(s).

At 440, the translated modified access information is provided to end system(s). At 450, the translated modified access information is employed to enforce a security policy.

Figure 5:
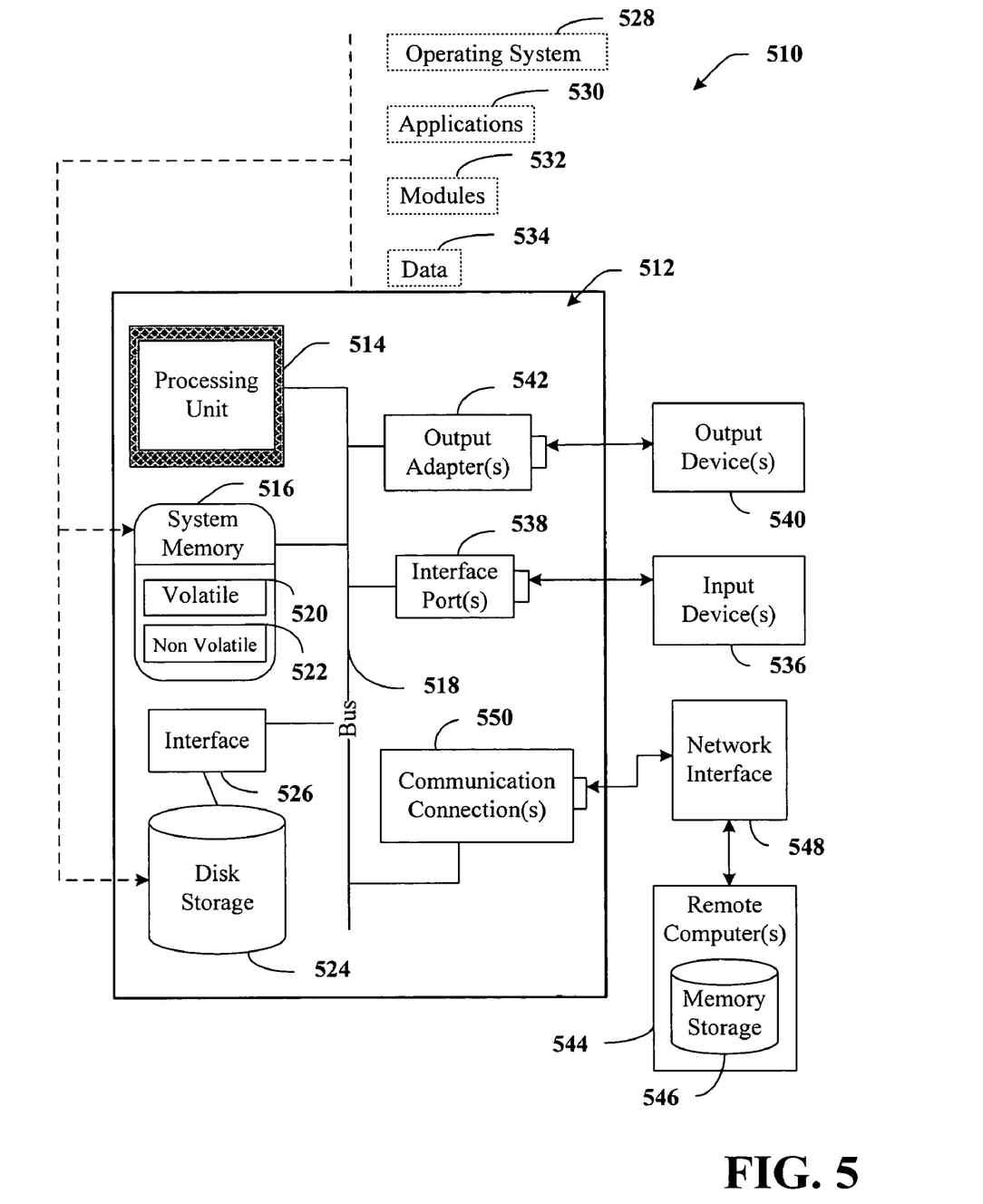
FIG. 5 illustrates an example operating environment.

In order to provide additional context for various aspects of the claimed subject matter, FIG. 5 and the following discussion are intended to provide a brief, general description of a suitable operating environment 510. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 510 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, database systems, network PCs, minicomputers, mainframe computers, distributed computing environments that include the above systems or devices, and the like.

With reference to FIG. 5, an exemplary environment 510 includes a computer 512. The computer 512 includes a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514.

The system bus 518 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 516 includes volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable ROM (EEPROM), or flash memory. Volatile memory 520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 512 also includes removable/nonremovable, volatile/nonvolatile computer storage media. FIG. 5 illustrates, for example a disk storage 524. Disk storage 524 includes, but is not limited to, devices like a magnetic disk drive, floppy disk drive, tape drive, Jaz drive, Zip drive, LS-100 drive, flash memory card, or memory stick. In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 5 describes software that acts as an intermediary between users and the basic computer resources described in suitable operating environment 510. Such software includes an operating system 528. Operating system 528, which can be stored on disk storage 524, acts to control and allocate resources of the computer system 512. System applications 530 take advantage of the management of resources by operating system 528 through program modules 532 and program data 534 stored either in system memory 516 or on disk storage 524. It is to be appreciated that the claimed subject matter can be implemented with various operating systems or combinations of operating systems.

A user enters commands or information into the computer 512 through input device(s) 536. Input devices 536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 514 through the system bus 518 via interface port(s) 538. Interface port(s) 538 include, for example, a serial port, a parallel port, a game port, and a universal serial bus (USB). Output device(s) 540 use some of the same type of ports as input device(s) 536. Thus, for example, a USB port may be used to provide input to computer 512, and to output information from computer 512 to an output device 540. Output adapter 542 is provided to illustrate that there are some output devices 540 like monitors, speakers, and printers among other output devices 540 that require special adapters. The output adapters 542 include, by way of illustration and not limitation, video and sound cards that provide a means of connection between the output device 540 and the system bus 518. It should be noted that other devices and/or systems of devices provide both input and output capabilities such as remote computer(s) 544.

Computer 512 can operate in a networked environment using logical connections to one or more remote computers, such as remote computer(s) 544. The remote computer(s) 544 can be a personal computer, a server, a router, a network PC, a workstation, a microprocessor based appliance, a peer device or other common network node and the like, and typically includes many or all of the elements described relative to computer 512. For purposes of brevity, only a memory storage device 546 is illustrated with remote computer(s) 544. Remote computer(s) 544 is logically connected to computer 512 through a network interface 548 and then physically connected via communication connection 550. Network interface 548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/ software employed to connect the network interface 548 to the bus 518. While communication connection 550 is shown for illustrative clarity inside computer 512, it can also be external to computer 512. The hardware/software necessary for connection to the network interface 548 includes, for exemplary purposes only, internal and external technologies such as, modems including regular telephone grade modems, cable modems and DSL modems, ISDN adapters, and Ethernet cards.

Figure 6:
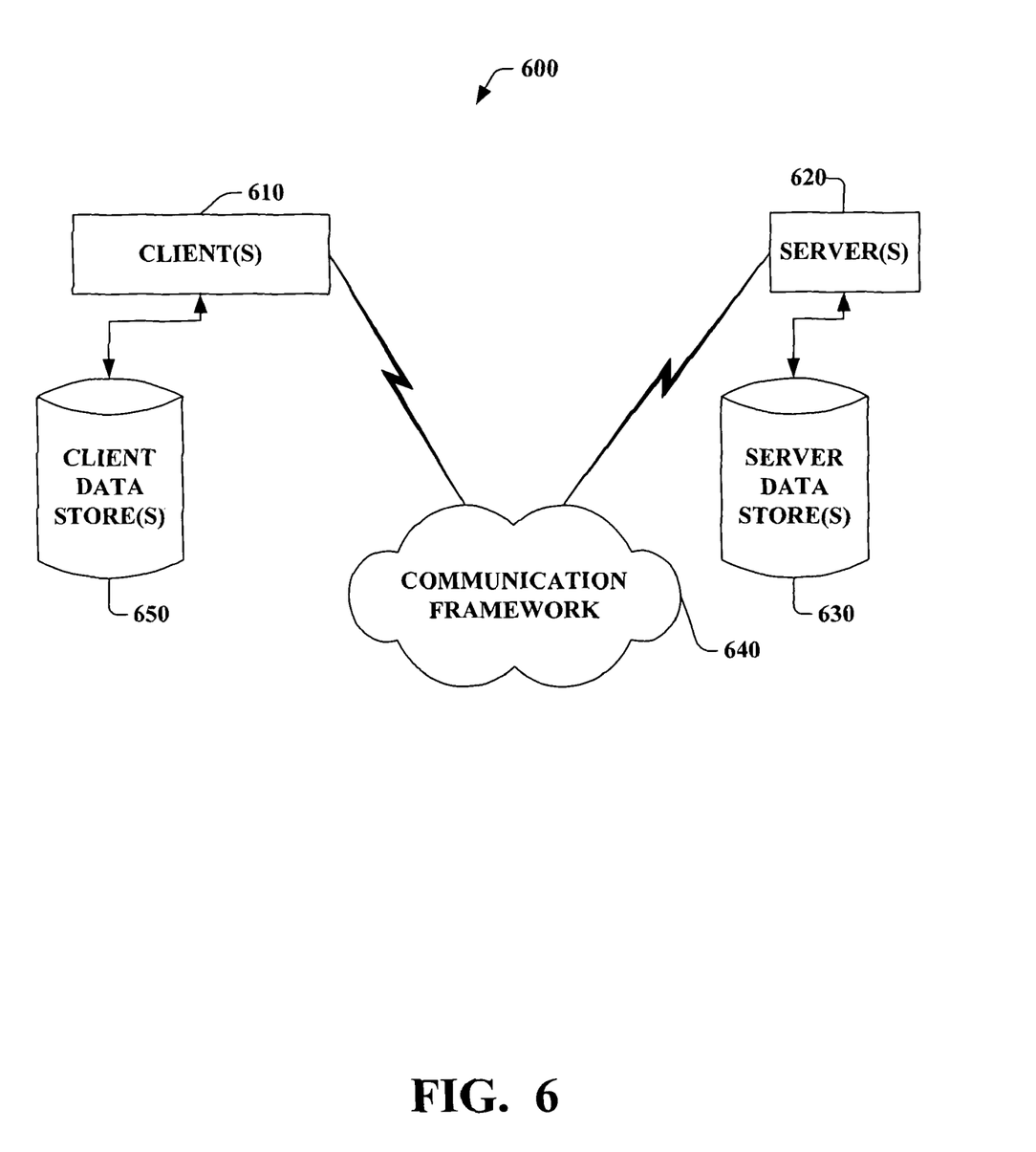
FIG. 6 illustrates an exemplary networking environment.

FIG. 6 is a schematic block diagram of a sample-computing environment 600 with which the claimed subject matter can interact. The system 600 includes one or more client(s) 610. The client(s) 610 can be hardware and/or software (e.g., threads, processes, computing devices). The system 600 also includes one or more server(s) 620. The server(s) 620 can be hardware and/or software (e.g., threads, processes, computing devices). The servers 620 can house threads to perform transformations by employing the subject innovation, for example.

One possible communication between a client 610 and a server 620 can be in the form of a data packet adapted to be transmitted between two or more computer processes. The system 600 includes a communication framework 640 that can be employed to facilitate communications between the client(s) 610 and the server(s) 620. The client(s) 610 are operably connected to one or more client data store(s) 650 that can be employed to store information local to the client(s) 610. Similarly, the server(s) 620 are operably connected to one or more server data store(s) 630 that can be employed to store information local to the servers 620.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer program product for use at a computer system, the computer program product for implementing a method for accessing permission information, the computer program product comprising one or more computer-readable physical storage media having stored thereon computer-executable instructions that when executed by a processor cause the computer system to perform the following:

store permission information for a resource, wherein the permission information is stored in a first format that is in a user readable format;

transform the permission information from the first format into a second format that is consumable by a first end system type, the second format being different from the first format;

transform the permission information from the first format into a third format that is consumable by a second end system type and that is different from the first and second formats, wherein the second and third formats are determined by the end system type of the first and second end systems the permission information is to be provided to;

based at least in part upon a change in the permission information, provide the permission information that has been transformed from the first format into the second format to the first end system in the second format consumable by the first end system type; and provide the permission information that has been transformed from the first format into the third format to the second end system in the third format that is consumable by the second end system type;

wherein the first and second end systems are configured to enforce a security policy associated with permission information when executing the permission information.

2. The computer program product of claim 1, where the permission information is configured to be installed at the first and second end system such that an authorization request does not have to be communicated by the first and second end system after the installation of the permission information.

3. The computer program product of claim 1, wherein transforming the permission information into a second or third format includes making the second or third format compatible with at least one of NTFS, Rights Management Services, SQL, or Authorization Manager.

4. The computer program product of claim 3, wherein the transformed permission information is stored in a separate area of data store of the computer system or in a separate area in a set of data stores of the computer system.

5. The computer program product of claim 3, further comprising:
performing rule checking on the permission information.

6. The computer program product of claim 3, further comprising wherein transforming the permission information from the first format into the second or third formation is performed by a plurality of translators, each of the translators able to translate the user readable first format into the second or third format that is consumable by a different end system type.

7. The computer program product of claim 3, wherein transforming the permission information from the first format into the second or third formation is performed by a single translator employed to translate the user readable first format into the second or third formats.

8. The computer program product of claim 1, further comprising:
allowing an administrator, a set of administrators, or a set of processes including processes implementing workflow to manipulate the stored permission information.

9. The computer program product of claim 1, wherein the permission information is stored in a data store comprising a plurality of data store instances.

10. The computer program product of claim 1, further comprising synchronizing data access policy information employed by one or more of the first and second end systems.

11. The computer program product of claim 1, wherein the permission information is stored in a data store that is a relational database system.

12. The computer program product of claim 1, further comprising providing the permission information to the first or second end system based, at least in part, upon a preconfigured rule.

13. An access permission information method, comprising:
receiving modified access information in a user-readable first format;
storing the modified access information in a central access data store;
storing the modified access information;
translating the modified access information from the user-readable first format into at least second and third formats that are different from the first format and usable by at least two different end system types and wherein the second format is different from the third format, the at least second and third formats selected from a list comprising an Access Control List format, an SQL server format, NTFS-compatible format, and Rights Management Services format; and
providing the translated modified access information to at least first and second end systems, the first and second end system having a different end system type and receiving a different one of the at least second and third formats, wherein the second and third formats are determined by the end system type of the first and second end systems that the modified access information is to be provided to the modified access permission information configured to cause the first and second end systems to enforce a security policy associated with the modified access permission information.

14. The method of claim 13, wherein the modified access information is configured to be installed at the first and second end systems such that an authorization request does not have to be communicated to the central access data store after the installation of the modified access information.

15. A method for accessing permission information, comprising:
storing permission information for a resource in a data store, wherein the permission information is stored in a first format that is in a user readable format;
transforming the permission information from the first into a second format that is consumable by a first end system type, the second format being different from the first format;
transforming the permission information from the first format into a third format that is consumable by a second end system type and that is different from the first and second formats, wherein the second and third formats are determined by the end system type of the first and second end systems the permission information is to be provided to;
based at least in part upon a change in the permission information stored in the data store, providing the permission information that has been transformed from the first format into the second format to the first end system in the second format consumable by the first end system type; and
providing the permission information that has been transformed from the first format into the third format to the second end system in the third format that is consumable by the second end system type;
wherein the first and second end systems are configured to enforce a security policy associated with permission information when executing the permission information.

* * * * *